(12) United States Patent
Meier et al.

(10) Patent No.: US 7,380,150 B2
(45) Date of Patent: May 27, 2008

(54) METHOD FOR SELECTING AN INDUCTIVE OR BATTERY POWER SUPPLY BASED ON THE VOLTAGE SENSED THEREFROM FOR A TRANSPONDER SYSTEM

(75) Inventors: Herbert Meier, Moosburg (DE); Ruediger Ganz, Freising (DE); Andreas Hagl, Dachau (DE)

(73) Assignee: Texas Instruments Incorporated, Dallas, TX (US)

( * ) Notice: Subject to any disclaimer, the term of this patent is extended or adjusted under 35 U.S.C. 154(b) by 603 days.

(21) Appl. No.: 10/787,611

(22) Filed: Feb. 25, 2004

(65) Prior Publication Data
US 2004/0189263 A1    Sep. 30, 2004

(30) Foreign Application Priority Data
Feb. 28, 2003    (DE) .......................... 203 03 301 U

(51) Int. Cl.
*G06F 1/00* (2006.01)
(52) U.S. Cl. ..................... 713/340; 713/300; 713/320; 307/43
(58) Field of Classification Search ................ 713/300, 713/320, 340; 307/43
See application file for complete search history.

(56) References Cited

U.S. PATENT DOCUMENTS

| | | | |
|---|---|---|---|
| 4,401,894 A | * | 8/1983 | Weisner ........................ 307/64 |
| 4,451,742 A | * | 5/1984 | Aswell ......................... 307/66 |
| 4,692,604 A | * | 9/1987 | Billings ....................... 235/493 |
| 5,285,779 A | * | 2/1994 | Cameron et al. ............... 607/5 |
| 6,188,309 B1 | * | 2/2001 | Levine ....................... 340/5.66 |
| 6,275,681 B1 | | 8/2001 | Vega et al. |
| 7,065,658 B1 | * | 6/2006 | Baraban et al. ............. 713/300 |
| 2003/0019942 A1 | | 1/2003 | Blossom |

FOREIGN PATENT DOCUMENTS

| | | |
|---|---|---|
| EP | 0 875 851 A2 | 11/1998 |
| GB | 2 292 866 A | 3/1996 |

\* cited by examiner

*Primary Examiner*—Thomas Lee
*Assistant Examiner*—Malcolm D Cribbs
(74) *Attorney, Agent, or Firm*—J. Dennis Moore; W. James Brady, III; Frederick J. Telecky, Jr.

(57) ABSTRACT

A power management circuit for a system that has combined power supplies from an inductively coupled circuit and from a battery comprises voltage sensing circuitry for sensing the voltage of each of the power supplies. A switching arrangement selectively connects one of the power supplies with a user or with plural users. The switching arrangement is controlled by appropriate control circuitry in response to outputs from the voltage sensing circuitry. The power management makes the best use of energy received over the inductive interface to preserve battery lifetime.

10 Claims, 4 Drawing Sheets

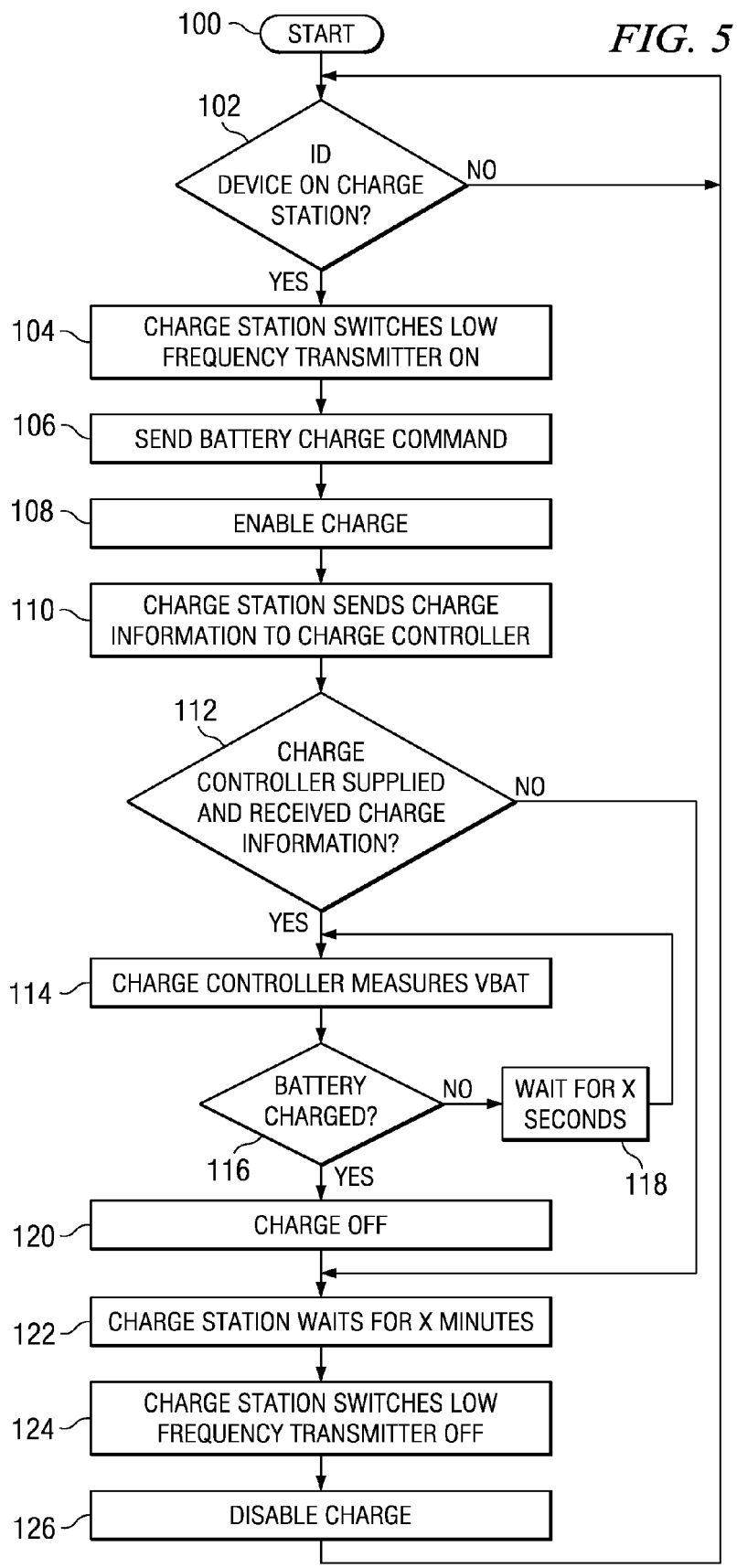

METHOD FOR SELECTING AN INDUCTIVE OR BATTERY POWER SUPPLY BASED ON THE VOLTAGE SENSED THEREFROM FOR A TRANSPONDER SYSTEM

TECHNICAL FIELD OF THE INVENTION

The present invention relates to a power management circuit and, in particular, to a power management circuit for use with a system that has combined power supplies from an inductively coupled circuit and from a battery.

BACKGROUND OF THE INVENTION

Transponders are typical systems that use inductive coupling for data transfer and also for energy transfer. The inductive interface includes an antenna coil and a capacitor forming a resonant circuit, and a rectifier with a storage capacitor. Since a transponder is supplied from inductively transmitted energy, it may be battery-less. An example of a battery-less transponder is a vehicle immobilizer. A vehicle immobilizer is a portable device that may include a physical key fitting into a lock, in addition to a transponder. While the basic function of such a device is that of a reliable key, other features may be added. For example, remote control functionality is among the features that respond to the ongoing demands for comfort. Remote control generally involves a RF transceiver, which needs to be powered from a battery. In spite of their increasing complexity, these systems are mass products and it is essential to keep the system costs as low as possible. A considerable reduction of the total system cost is achieved by combining plural functions in a single circuit and by sharing resources such as a controller, encryption circuits or memory, allowing to reduce the chip size. The shared circuit parts must be supplied regardless whether a supply is available from the inductive interface or from a battery. Since each power supply can have a voltage between zero and a maximum voltage up to e.g. 8 volt, an intelligent power management is required. The power management should make the best use of energy received over the inductive interface to preserve battery lifetime. In addition, energy received over the inductive interface in excess of that required for the basic functionality, should be made available to charge the battery (if a rechargeable battery is used). Also, conflicts between the power supplies must be avoided.

SUMMARY OF THE INVENTION

The present invention provides an intelligent power management circuit that allows an optimum use of energy from two different power supplies, one of which has an inductive interface and the other of which has a battery. Specifically, the invention provides a power management circuit for a system that has combined power supplies from an inductively coupled circuit and from a battery. The power management circuit comprises voltage sensing circuitry for sensing the voltage of each of the power supplies. A switching arrangement selectively connects one of the power supplies with a user or with plural users. The switching arrangement is controlled by appropriate control circuitry in response to outputs from the voltage sensing circuitry.

In the preferred embodiments of the invention, the power management circuit allows particular circuit parts, such as the immobilizer analog circuits, to be supplied from the inductively coupled circuit independent of the battery supply. Other digital and shared circuit parts may be supplied through voltage regulators near the minimum required voltage level to reduce current consumption. The digital and shared circuit parts may be alternately supplied from the inductive interface, also in case of an empty battery, or from the battery supply in response to the results of a voltage comparison. If both supplies are available, a preference is given to the supply from the inductive interface to preserve battery lifetime.

In a further preferred embodiment, circuit parts that have a relatively high current consumption such as a RF transmitter may be supplied from the inductive interface. In that case, a voltage drop below the minimum required for operation of other essential circuit parts is avoided by monitoring the voltage level and inserting a voltage regulator.

Where a rechargeable battery is used, the preferred embodiment of the invention permits excess energy received over the inductive interface to be used for the purpose of charging the battery. A separate controller may be used to control the charging process if the supply voltage is sufficient for operation of the controller. Below the voltage level required for operation of the controller, a voltage regulator in combination with a switch protects the power supply from being heavily loaded by an empty battery, thereby avoiding a voltage drop below the minimum level required for operation of essential circuit parts.

Another advantage of an embodiment is the option to provide a backup supply from the inductive interface to permit battery replacement.

BRIEF DESCRIPTION OF THE DRAWINGS

Further advantages and features will appear from the following detailed description of preferred embodiments with reference to the appending drawings.

FIG. 5 is a flow chart illustrating a battery charge process.

DETAILED DESCRIPTION OF THE INVENTION

Figure 1:
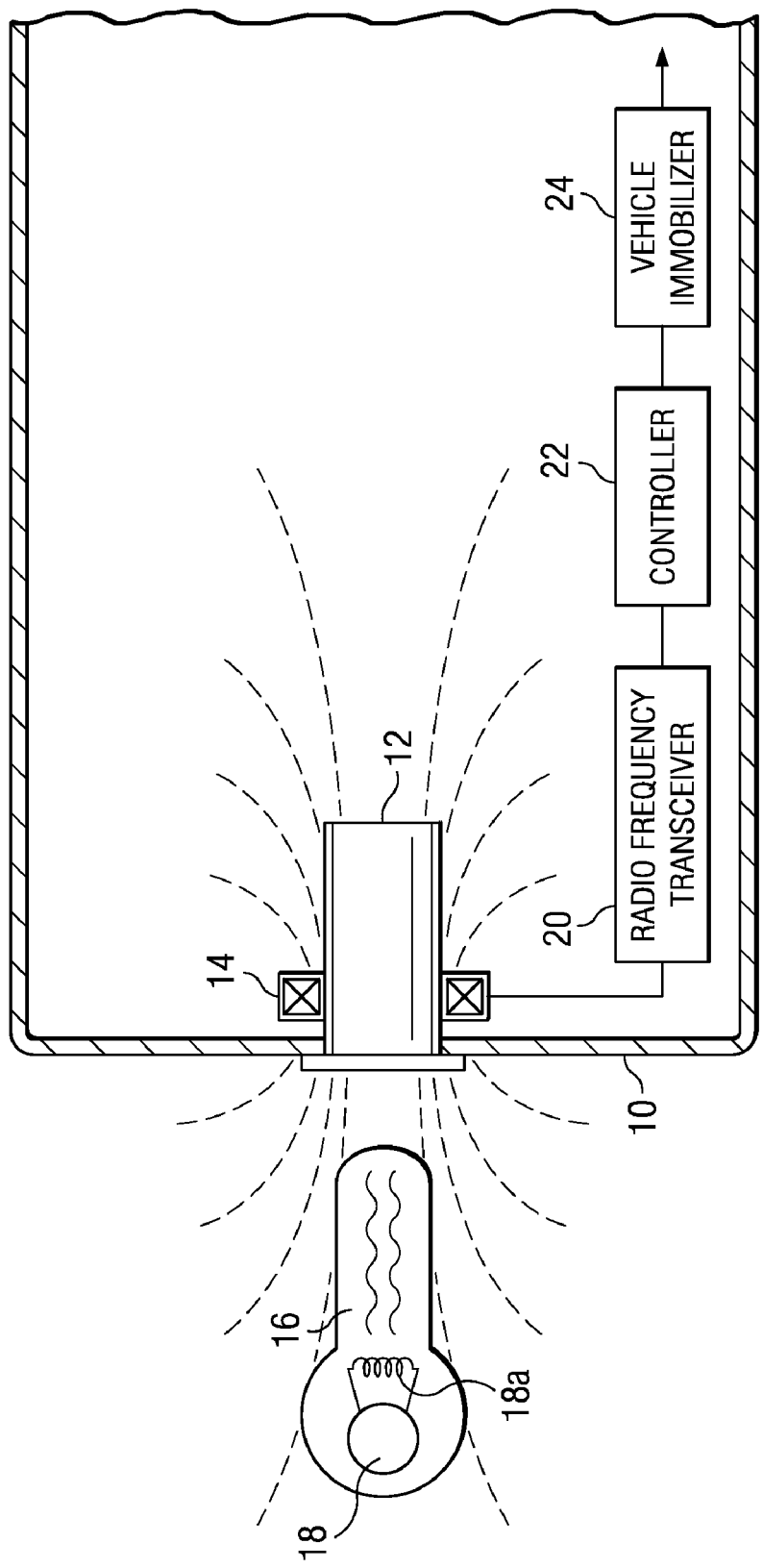
FIG. 1 is a sketch illustrating a typical environment for a device that includes the inventive power management circuit.

With reference to FIG. 1, the sketch schematically depicts a safety system behind a vehicle dashboard 10 with a key-lock cylinder 12 mounted therein. An air coil 14 surrounds the key-lock cylinder 12. A portable device 16, i.e. a physical key that fits into the key-lock cylinder 12, is equipped with an electronic identification device 18. A RF transceiver 20 is connected to the air coil 14. The RF transceiver 20 is connected to a controller 22, which is also connected to a vehicle immobilizer 24.

The electronic identification device 18 includes a transponder that co-operates with transceiver 20. Specifically, the transponder within device 18 is inductively coupled with air coil 14 by means of an internal antenna coil 18a. In operation, the RF transceiver 20, under control of controller 22, drives air coil 14 with RF interrogation signals. The interrogation signals convey both data and electromagnetic energy and are received by the internal antenna coil 18a within device 18. Since the device 18 is inductively coupled with the safety system installed within the vehicle, it may be battery-less.

So far, the system depicted in FIG. 1 is conventional; it may be found in modern vehicles.

More sophisticated systems require the portable device 16 to support comfort functions such as remote control and remote keyless entry. These functions by necessity involve a RF transmitter that must be supplied from a battery. To preserve battery lifetime, an intelligent power management is required.

When a rechargeable battery is used for the portable device 16, the stationary safety system behind dashboard 10 may function as a charge station. It may receive battery condition indication signals from the portable device 16 and, in response, initiate a battery charge process.

Figure 2:
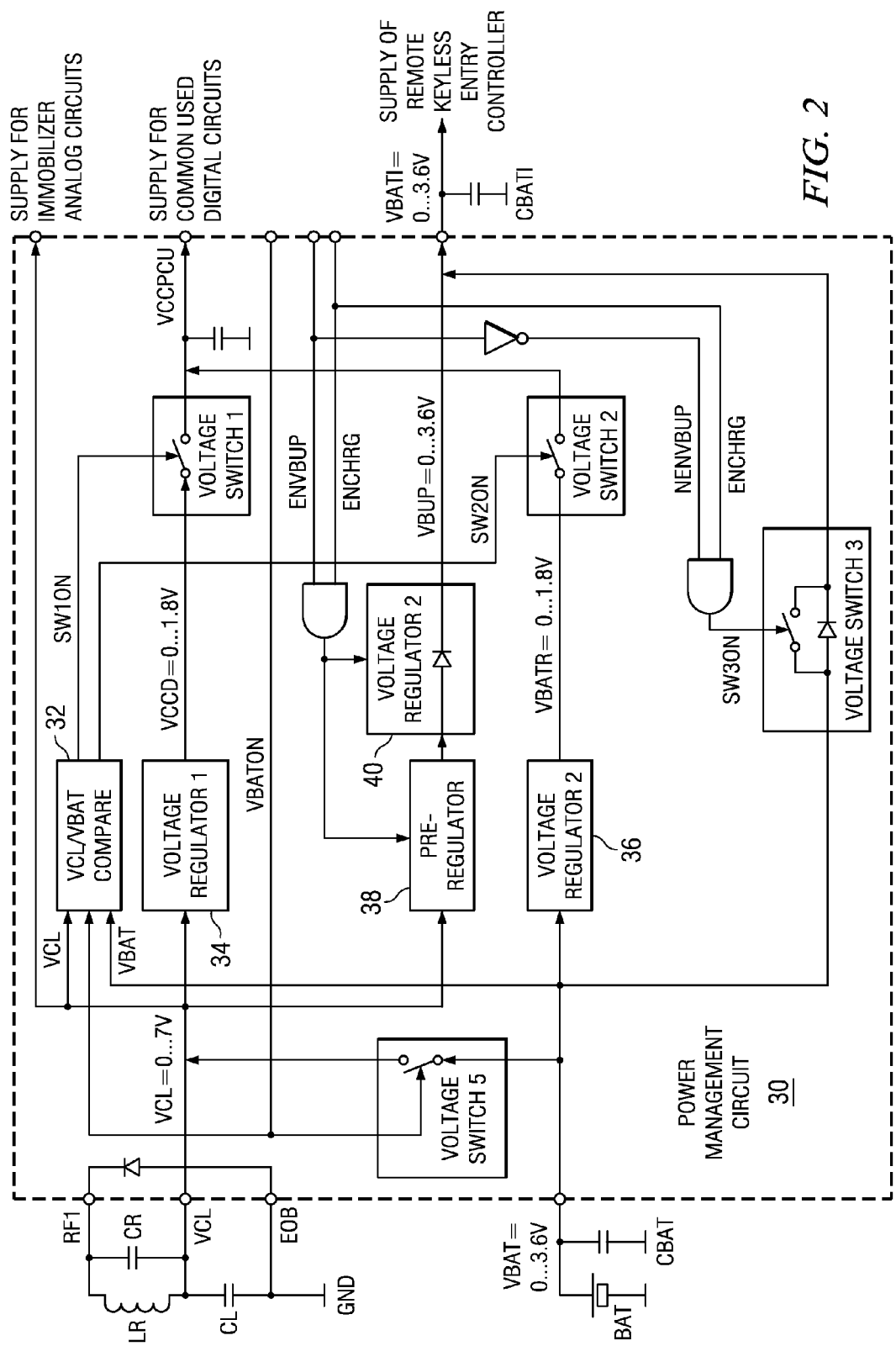
FIG. 2 is a block diagram of the power management circuit.

With reference now to FIG. 2, a power management circuit 30 for use in an electronic identification device 18 of FIG. 1 has an inductive interface formed by a parallel resonant circuit that includes an inductivity LR (materialized by antenna coil 18a) and a capacitor CR. A storage capacitor CL is connected between a ground terminal GND and one of the nodes, referred to as terminal VCL, of the parallel resonant circuit including LR and CR. The other node, referred to as terminal RF1, of the parallel resonant circuit including LR and CR is connected to the cathode of a rectifier diode D the anode of which is connected to the ground terminal GND.

Diode D may be a substrate diode if the power management circuit 30 of FIG. 2 is implemented in a CMOS technology.

Diode D and storage capacitor CL form a rectifier circuit. Provided that, in operation, the antenna coil 18a is inductively coupled with air coil 14 and the latter is driven with appropriate signals, terminal VCL constitutes a first power supply terminal referenced to ground terminal GND. In practical implementations, the voltage level of terminal VCL may vary between zero and a maximum of less than 8 volt. Accordingly, a first power supply is formed by an inductively coupled circuit.

A second power supply is formed by a rechargeable battery BAT connected between ground terminal GND and terminal VBAT of circuit 30. A buffer capacitor CBAT may be connected across battery BAT.

The power management circuit 30 has at least three different supply outputs.

A first supply output is directly taken from terminal VCL. In the specific embodiment, this is a supply for the vehicle immobilizer analog circuits.

A second supply at a terminal referred to as VCCPCU is selectively taken either from terminal VCL, or from terminal VBAT. In both cases, a voltage regulator and a switch are inserted, as will be disclosed more in detail. In the particular embodiment disclosed, the second supply is a supply for shared digital circuits.

Whether the supply at terminal VCCPCU is taken from terminal VCL or from terminal VBAT, is decided by a voltage sensing circuit 32 which has an input connected to terminal VCL and an input connected to terminal VBAT. The voltage sensing circuit 32 also has two control outputs, each for controlling one of two switches SW 1 and SW 2 in the supply paths from terminals VCL and VBAT, respectively. The supply path from terminal VCL includes a voltage regulator 34 in series with switch SW 1. The supply path from terminal VBAT includes a voltage regulator 36 in series with switch SW 2.

A third supply output at a terminal VBATI is also taken from terminal VCL, but through a threshold circuit 38 and a voltage regulator 40, as will be disclosed more in detail. In the particular embodiment considered here, the third supply is for a remote keyless entry controller.

Although not shown in FIG. 2, a fourth supply may be taken directly from terminal VBAT, for a transmitter of a remote control system, for example.

Figure 3:
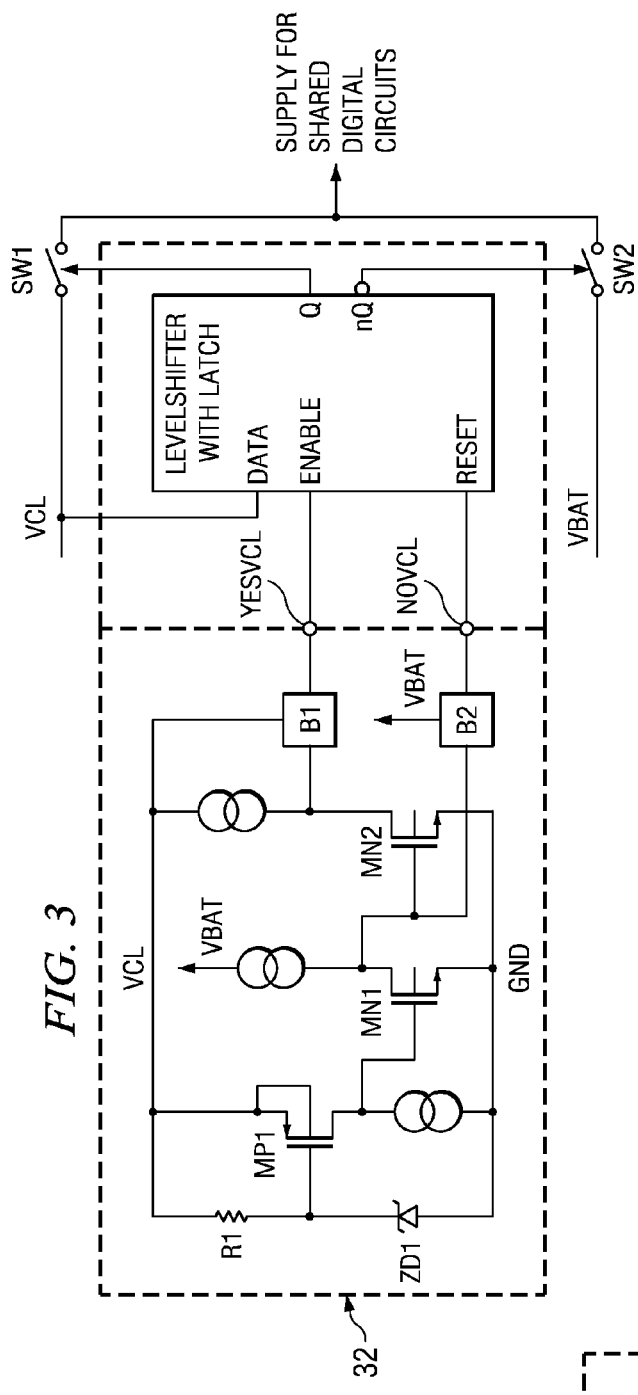
FIG. 3 is a circuit diagram of a voltage sensing circuit.

With reference to FIG. 3, the voltage sensing circuit 32 will be disclosed more in detail. The voltage sensing circuit in FIG. 3 has a first supply from terminal VCL and a second supply from terminal VBAT, both referenced to the common ground terminal GND. A resistor R1 is connected in series with a Zener diode ZD1 between VCL and GND. The common node between R1 and ZD1 is connected to the gate of a PMOS transistor MP1, which has its source connected to VCL and its drain connected to GND through a current source. The drain of MP1 drives the gate of a NMOS transistor MN1, the source of which is connected to GND and the drain of which is connected to VBAT through a current source. The drain of MN1 drives the gate of another NMOS transistor MN2, the source of which is connected to GND and the drain of which is connected to VCL through a current source.

A first buffer B1 is driven by the drain of MN2 and supplied from VCL. A second buffer B2 is driven by the drain of MN1 and supplied from VBAT. Buffer B1 has an output at a terminal YESVCL, and buffer B2 has an output at terminal NOVCL. A latch circuit L incorporating a level-shifter has an enable input connected to terminal YESVCL and a reset input connected to terminal NOVCL. Output Q of latch circuit L operates switch SW 1, and the inverted output nQ operates switch SW 2.

In operation, MP1 remains blocked until the Zener voltage at ZD1 is reached. The Zener voltage of ZD1 is selected to correspond to the minimum required voltage level for proper operation of the logic circuitry intended to be supplied from VCL.

With MP1 blocked (OFF), MN1 is also blocked, and MN2 is conducting (ON). Consequently, terminal YESVCL is at a level near GND and terminal NOVCL is at level VBAT if VBAT is present. The battery is not loaded in this state. Output nQ of latch circuit L is high, switch SW 2 is closed; output Q is low and switch SW 1 is open.

With MP1 conducting (ON), MN1 is also conducting, and MN2 is blocked (OFF). Consequently, terminal YESVCL is at a level near VCL and terminal NOVCL is at level near GND. Output Q of latch circuit L is high, switch SW 1 is closed; output nQ is low and switch SW 2 is open. Here, the battery is only loaded with one unit current (typ. 100 nA). This is not permanent because this state exists only if VCL is derived from the RF field.

The voltage sensing circuit as disclosed has several important aspects.

First, it addresses the problem of a reliable existence check for both supplies (VCL and VBAT). A voltage sensing circuit cannot provide a reliable output when it has no supply for itself.

Second, the alternative connection of either of the two supplies works without any voltage drop.

Third, two high-active signals are available to indicate the existence and the non-existence of VCL (Note: a low-active signal is not distinguishable from a missing supply).

Fourth: the signal indicating the non-existence of VCL (NOVCL) is driven from VBAT. Consequently, a weak VCL is indicated only with VBAT, independent of VCL. Thus, SW 2 is closed only with VBAT present.

Fifth: The signal indicating the existence of VCL (YESVCL) is derived from VCL itself. This means that SW 1 is closed even without the existence of VBAT.

Sixth: When both supplies (VCL and VBAT) exist, VCL is the dominant supply to preserve battery lifetime.

Seventh: No battery consumption occurs in the standby mode, i.e. when VCL is non-existent. This ensures battery lifetime over years.

Voltage regulators 34 and 36 (FIG. 2) ensure that the connected user at terminal VCCPCU is supplied at the minimum required voltage level for proper operation to reduce the total current consumption.

The preferred embodiment of the power management circuit includes a battery charge feature and a battery backup feature for battery replacement.

Figure 4:
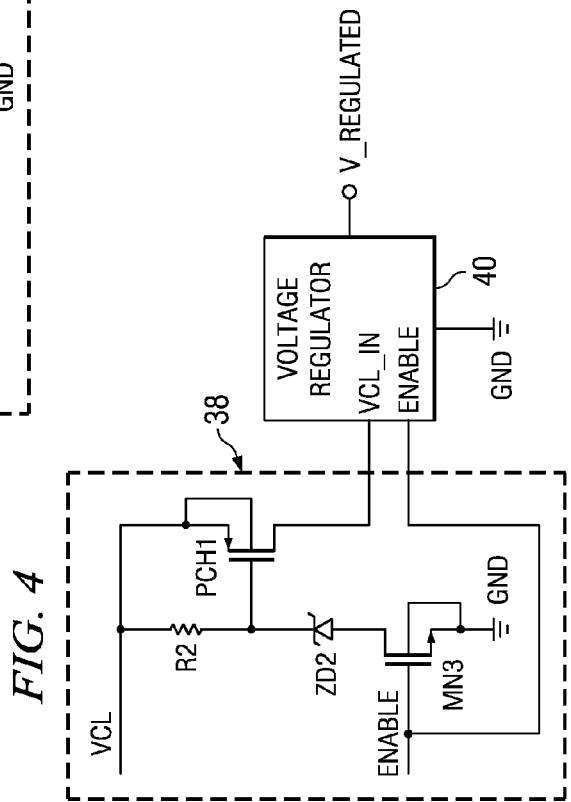
FIG. 4 is a circuit diagram of a combined threshold circuit and voltage regulator.

With reference to FIG. 4, threshold circuit 38, also referred to as a pre-regulator in FIG. 2, includes a series connection of a resistor R2, a Zener diode ZD2 and an NMOS transistor MN3 between VCL and GND. The node between Resistor R2 and Zener diode ZD2 is connected to the gate of a pass transistor PCH1, the source of which is connected to VCL and the drain of which is connected to an input VVC_IN of voltage regulator 40. An enable input is applied to the gate of transistor MN3 and to voltage regulator 40 from the output of an OR gate (FIG. 2) that has inputs ENVBUP and ENCHRG.

In operation, pass transistor PCH1 remains blocked until VCL reaches the Zener voltage of diode ZD2 and an enable signal is received. With a sufficient voltage level of VCL, voltage regulator 40 receives a supply at input VCL_IN and provides a regulated output V_Regulated if an enable input is received. It should be understood that the output V_Regulated is equivalent to supply output VBATI in FIG. 2. This prevents VCL from dropping below a sufficient voltage level, independent of loads at VBAT1.

With reference to FIG. 2, a switch SW 3 is provided to connect supply terminal VBATI to terminal VBAT in response to a battery charge command (issued by a charge station, see FIG. 1). Switch SW 3 is controlled by an output of a gate circuit that receives input ENCHRG and inverted input ENVBUP, i.e. NENVBUP.

Terminals VBAT and VBATI may be provided with buffer capacitors CBAT and CBATI, respectively, as seen in FIG. 2.

Another feature apparent from FIG. 2 is a switch SW 5 that connects terminals VCL and VBAT with each other in response to a command VBATON.

With reference now to FIG. 5, a battery charge process is started at step 100. If an identification device 18 is detected in step 102, the charge station (FIG. 1) switches its LF transmitter on in step 104 to drive air coil 14. In step 106, a battery charge command is sent. In step 108, charge is enabled. In step 110, the charge station sends charge information to the charge controller within device 18. If the charge controller in step 112 determines that the charge information was supplied and received, a battery charge loop is entered at step 114. In step 114, the charge controller measures the battery voltage VBAT. As long as the battery voltage is below the rated maximum, as determined in step 116, the charge process is continued with waiting step 118. Otherwise, the charge loop is exited at step 120 with Charge disabled.

If step 112 determined that no charge information was received, or if step 120 returned with Charge disabled, step 122 continues with a several minutes waiting period for the charge station. Thereafter, step 124, the LF transmitter in the charge station is switched off. A "Disable Charge" command is then issued in step 126, and the loop returns to step 102.

The invention claimed is:

1. A power management circuit for a transponder system comprising:
    a power supply from an inductively couples circuit;
    a power supply from a battery,
    a voltage sensing circuitry for sensing a voltage of each said power supplies,
    a switching arrangement for selectively connecting one of said power supplies with at least one user, and
    control circuitry controlling said switching arrangement in response to an output of said voltage sensing circuitry
    wherein the voltage sensing circuitry includes threshold circuits that provide outputs for each power supply indicative of whether or not a respective power supply has a voltage considered sufficient for operation of said user, wherein the voltage sensing circuitry uses one of said power supplies to detect the voltage of another one of said power supplies and vice versa, and further comprising
    a battery charge circuit that is supplied by the power supply from the inductively coupled circuit when and if the voltage of said power supply exceeds a predetermined threshold
    wherein the predetermined threshold is selected to ensure proper basic functionality of circuitry within said transponder system.

2. The power management circuit of claim 1, wherein said battery charge circuit includes a voltage regulator.

3. The power management circuit according to claim 2, wherein a micro-controller external to the transponder system is supplied by said power supply from an inductively coupled circuit when said power supply has a voltage sufficient for operation of said micro-controller, said micro-controller then controlling the battery charge process.

4. The power management circuit according to claim 3, wherein said battery charge circuit includes a switch that is controlled by a battery charge command received from a charge station.

5. The power management circuit according to claim 4, wherein the inductively coupled circuit is a resonant circuit in a transponder with an antenna coil, a capacitor and a rectifier, the rectifier including a charge accumulation capacitor, and a vehicle immobilizer circuit is directly supplied from the charge accumulating capacitor.

6. The power management circuit according to claim 5, wherein the power supply from an inductively coupled circuit supplies a vehicle remote keyless entry controller through a voltage regulator.

7. The power management circuit of claim 6, and comprising a buffer capacitor connected across the output of the voltage regulator.

8. The power management circuit according to claim 7, wherein the power supply from a battery directly supplies a RF transmitter of a remote keyless entry circuit.

9. The power management circuit according to claim 5, wherein the power supply from the inductively coupled circuit provides a backup supply for the battery during battery replacement.

10. The power management circuit according to claim 9, wherein the voltage sensing circuit provides a high output indicative of the non-existence of one power supply using a supply voltage from the other power supply.

* * * * *